US012291043B2

(12) United States Patent

Moriyama et al.

(10) Patent No.: US 12,291,043 B2

(45) Date of Patent: May 6, 2025

(54) RECORDING APPARATUS

(71) Applicant: SEIKO EPSON CORPORATION, Tokyo (JP)

(72) Inventors: Ryuji Moriyama, Matsumoto (JP); Akimasa Nozawa, Tatsuno-machi (JP); Yuta Watanabe, Matsumoto (JP); Tsutomu Ozaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 239 days.

(21) Appl. No.: 18/183,814

(22) Filed: Mar. 14, 2023

(65) Prior Publication Data

US 2023/0294436 A1 Sep. 21, 2023

(30) Foreign Application Priority Data

Mar. 15, 2022 (JP) ................................ 2022-039865

(51) Int. Cl.
*B41J 29/02* (2006.01)
*B41J 29/13* (2006.01)

(52) U.S. Cl.
CPC ............... *B41J 29/02* (2013.01); *B41J 29/13* (2013.01)

(58) Field of Classification Search
CPC ................................. B41J 29/02; B41J 29/13
See application file for complete search history.

(56) References Cited

U.S. PATENT DOCUMENTS

2004/0169894 A1* 9/2004 Schroath .............. H04N 1/1013 358/488

FOREIGN PATENT DOCUMENTS

JP 2000224359 A * 8/2000
JP 2000347319 A * 12/2000 ......... H04N 1/00519
JP 2011-073275 A 4/2011

* cited by examiner

*Primary Examiner* — Sharon Polk

(74) *Attorney, Agent, or Firm* — WORKMAN NYDEGGER

(57) ABSTRACT

A recording apparatus includes a medium supporting part configured to support a medium, a recording unit configured to perform recording on the medium supported by the medium supporting part, and a housing covering the medium supporting part and the recording unit. An opening for communication between inside and outside of the housing is provided in a first surface and a second surface intersecting the first surface of the housing. The housing includes a housing cover being openable and closable and configured to cover the opening. The housing cover includes a first cover configured to cover the opening in the first surface, and a second cover configured to cover the opening in the second surface. The first cover is coupled to the housing by a first coupling part. The second cover is coupled to the first cover through a second coupling part.

6 Claims, 15 Drawing Sheets

RECORDING APPARATUS

The present application is based on, and claims priority from JP Application Serial Number 2022-039865, filed Mar. 15, 2022, the disclosure of which is hereby incorporated by reference herein in its entirety.

BACKGROUND

1. Technical Field

The present disclosure relates to a recording apparatus.

2. Related Art

JP-A-2011-73275 discloses a printing apparatus. This printing apparatus includes a cover provided at the front surface of the apparatus body, and the cover opens by turning upward.

In the printing apparatus disclosed in JP-A-2011-73275, when the cover is opened, the cover is rotated and moved upward from the front surface of the printing apparatus. As such, to open the cover of the printing apparatus, a wide space is required around the printing apparatus.

SUMMARY

A recording apparatus according to an aspect of the present disclosure includes a medium supporting part configured to support a medium, a recording unit configured to perform recording on the medium supported by the medium supporting part, and a housing covering the medium supporting part and the recording unit, wherein an opening for communication between inside and outside of the housing is provided in a first surface and a second surface intersecting the first surface of the housing, the housing includes a housing cover being openable and closable and configured to cover the opening, the housing cover includes a first cover configured to cover the opening in the first surface and a second cover configured to cover the opening in the second surface, the first cover is coupled to the housing by a first coupling part, the second cover is coupled to the first cover through a second coupling part, the first coupling part couples the housing and one end portion of the first cover in a manner relatively turnable about a first direction, the second coupling part couples another end portion of the first cover and one end of the second cover in a manner relatively turnable about the first direction, and the housing cover is held by the housing, in a state where the housing cover is completely opened, with a rear surface of the first cover and a rear surface of the second cover overlapping each other.

DESCRIPTION OF EXEMPLARY EMBODIMENTS

Figure 1:
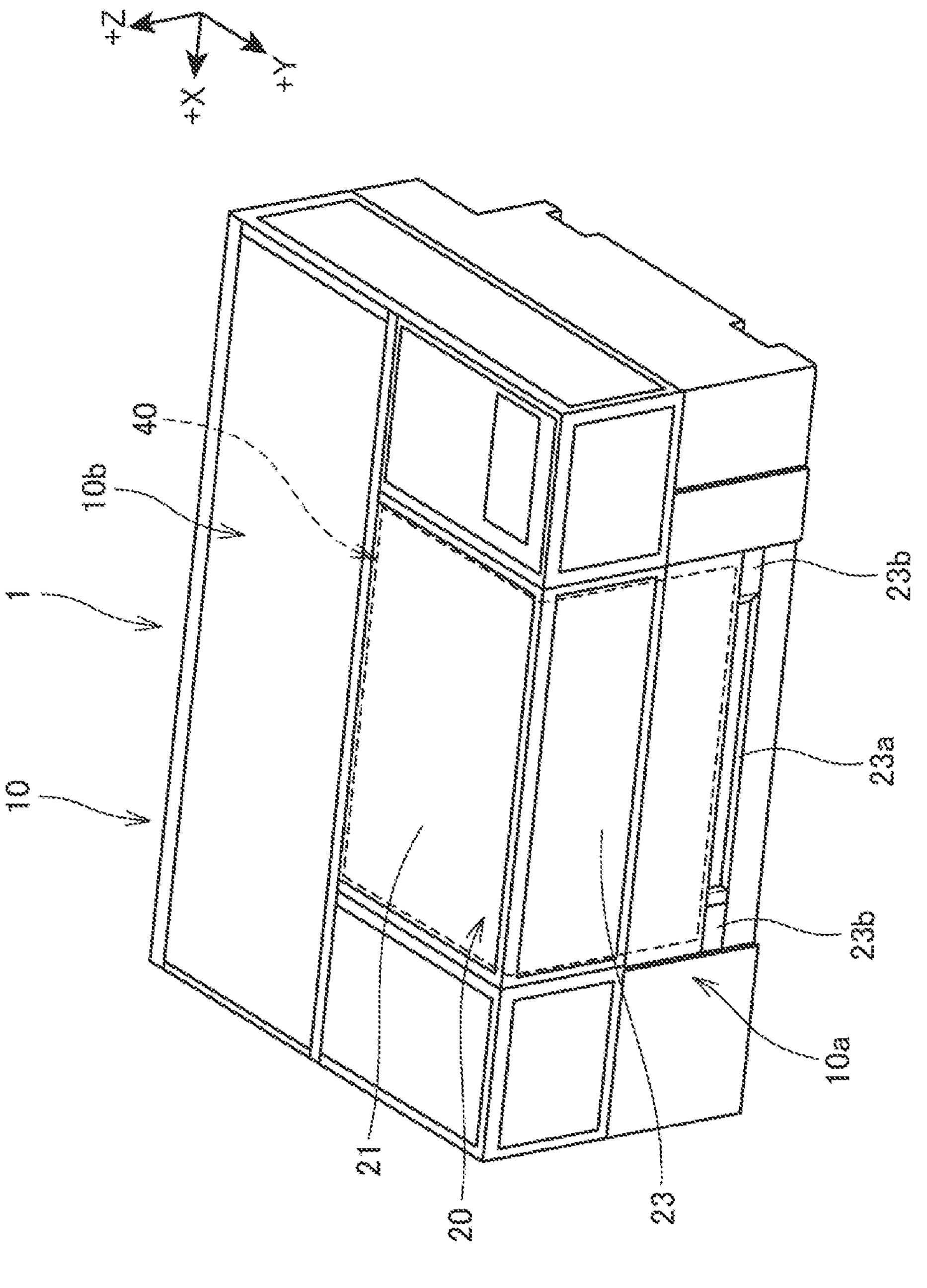
FIG. 1 is a perspective view of a recording apparatus according to the embodiment.

FIG. 1 is a perspective view of a recording apparatus 1 according to an embodiment. The recording apparatus 1 is an apparatus that performs recording on a medium M supported at a medium supporting part 30 by ejecting liquid from a recording head 89*a*. The medium M is a sheet, a cloth, or a three-dimensional object. The sheet may be paper, or a sheet made of synthetic resin. The cloth may be a non-woven cloth, a knitted cloth, or a woven cloth. The three-dimensional object includes clothing, shoes and other decorations, household items, machine parts, and various other objects. The type of the liquid to be ejected by the recording apparatus 1 to the medium M is not limited as long as it has fluidity. For example, the recording apparatus 1 is a printer that forms an image on the medium M by jetting ink of one or more colors to the surface of the medium M from the recording head 89*a*. In this case, the medium M corresponds to a printing medium.

FIG. 1 illustrates the X axis, the Y axis, and the Z axis. The X axis, the Y axis, and the Z axis are orthogonal to each other. The Z axis is an axis extending in the up-down direction, or may be referred to as an axis extending in the vertical direction. The X axis and the Y axis are parallel to the horizontal plane. In the following description, the direction along the X axis is the left-right direction, and the direction along the Y axis is the front-rear direction. Specifically, the positive direction along the Z axis is the upward direction, the positive direction along the X axis is the right direction, and the positive direction along the Y axis is the front direction. The left-right direction corresponds to an example of "first direction".

The recording apparatus 1 includes a housing 10. The housing 10 is a substantially cuboid box with a plurality of surfaces including a front surface 10*a* and a top surface 10*b*, and houses the medium supporting part 30, the recording head 89*a*, and the like that are described later. The front surface 10*a* and the top surface 10*b* intersect at approximately right angles. An opening 40 is formed in the housing 10. The opening 40 is an opening formed across the top surface 10*b* and the front surface 10*a* of the housing 10, and allows communication between the outside and inside of the housing 10. The top surface 10*b* corresponds to an example of "first surface". The front surface 10*a* corresponds to an example of "second surface".

The housing 10 includes a housing cover 20. The housing cover 20 is disposed along the top surface 10*b* and the front surface 10*a*. Specifically, the housing cover 20 includes a first cover 21 disposed along the top surface 10*b* to cover the opening 40 of the top surface 10*b*, and a second cover 23 disposed along the front surface 10*a* of the housing 10 to cover the opening 40 of the front surface 10*a*. A grip 23*a* for opening and closing is formed in the second cover 23. The user who uses the recording apparatus 1 can access each part housed in the housing 10 by gripping the grip 23*a* and opening the housing cover 20.

Figure 2:
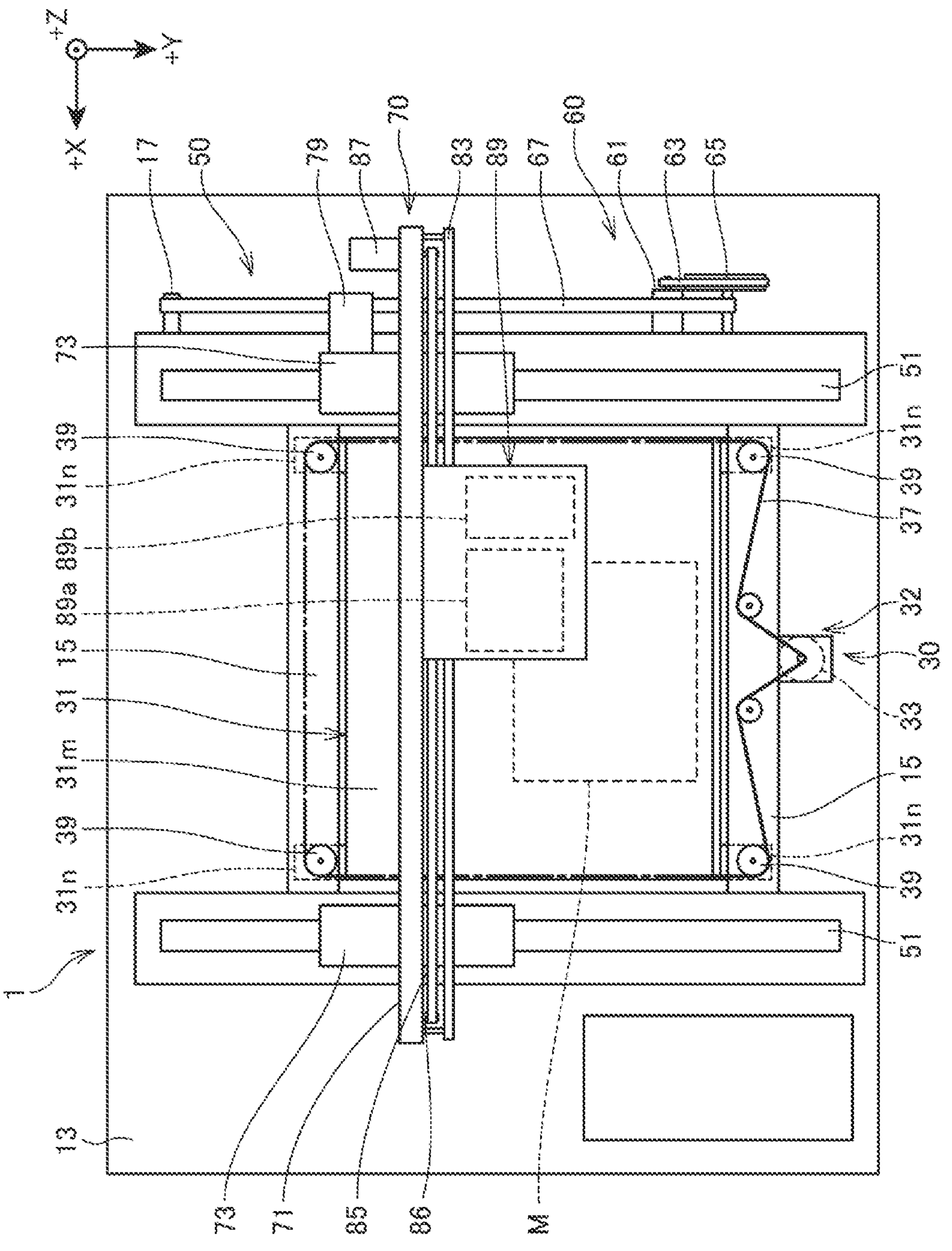
FIG. 2 is a plan view of the recording apparatus.
Figure 3:
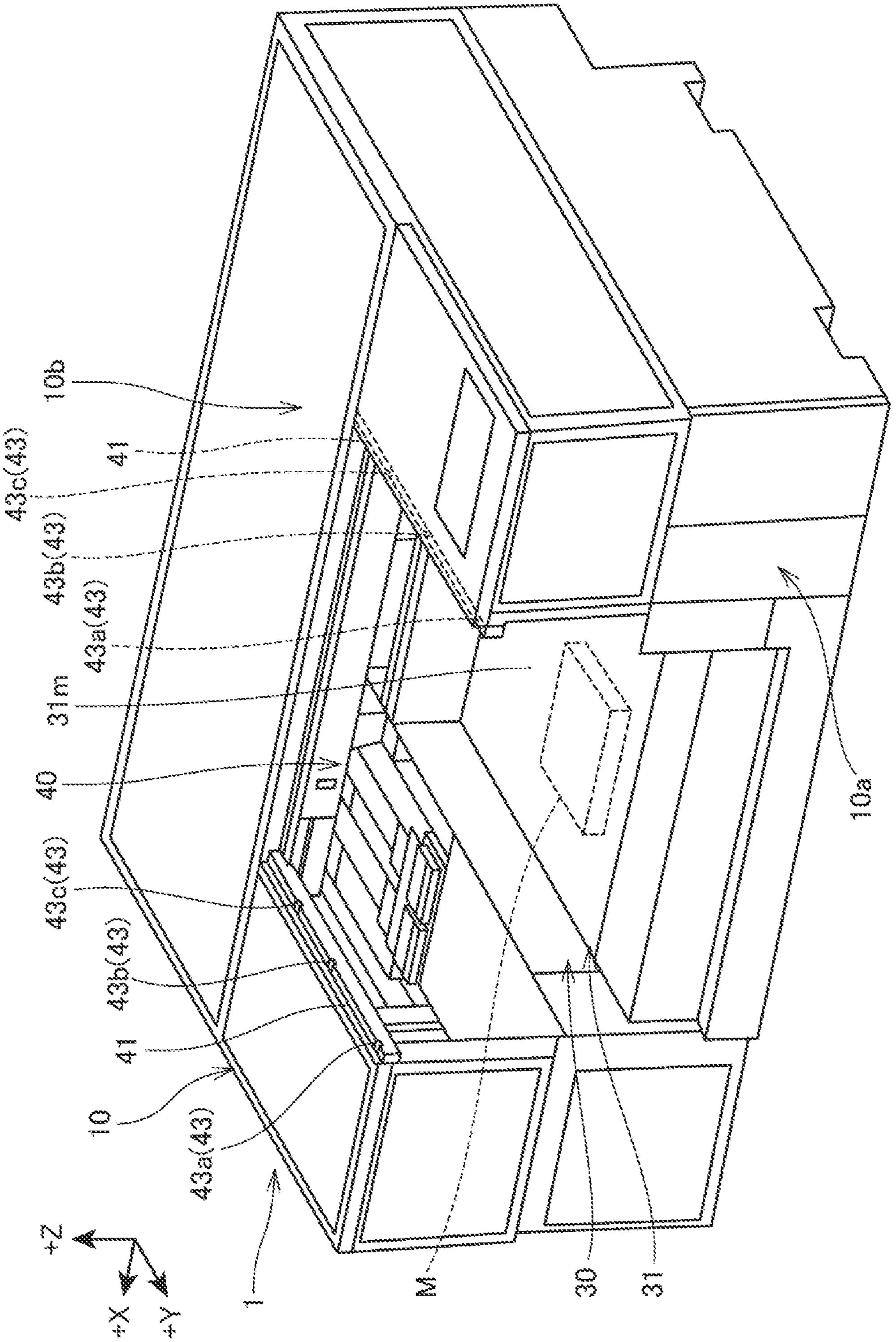
FIG. 3 is a perspective view of the recording apparatus.

FIG. 2 is a plan view of the recording apparatus 1, and schematically illustrates an internal structure of the recording apparatus 1. FIG. 3 is a perspective view of the recording apparatus 1, and illustrates a state where the housing cover 20 is removed for the sake of illustration.

As illustrated in FIG. 2, the recording apparatus 1 includes a pair of base members 15, a pair of guide shafts 51, the medium supporting part 30, a driving mechanism 50, and a movement unit 70. A base member 15 is a member extending in the left-right direction. The two base members 15 are disposed side by side in the front-rear direction on the bottom plate 13, and fixed to the bottom plate 13. The guide shafts 51 are shafts extending in the front-rear direction, and the two guide shafts 51 are disposed side by side in the left-right direction over two base members 15.

The medium supporting part 30 supports the medium M serving as a recording object in the recording apparatus 1. As illustrated in FIG. 2, the medium supporting part 30 includes a table 31 and a height moving mechanism 32. The table 31 is disposed at a position surrounded by the pair of base members 15 and the pair of guide shafts 51 in plan view. The table 31 includes a support surface 31*m*, which is a rectangular surface that extends along the X axis and the Y axis and faces upward.

The support surface 31*m* supports the medium M placed on the support surface 31*m*. As illustrated in FIG. 3, when the opening 40 is not closed with the housing cover 20, the support surface 31*m* is exposed to the front side and upper side of the housing 10. That is, the opening 40 exposes the medium supporting part 30 to the outside of the housing 10. Thus, in the state where the housing cover 20 is opened, the medium M outside the housing 10 can be set to the support surface 31*m* of the medium supporting part 30 from the front side. In addition, in the state where the housing cover 20 is opened, the medium M placed on the support surface 31*m* of the medium supporting part 30 can be taken out to the outside of the housing 10.

In addition, the table 31 includes a protrusion 31*n* protruding to the outside of the support surface 31*m* in plan view at the lower portions of the four corners of the support surface 31*m*. With the protrusion 31*n* fixed to a lifting mechanism 39 described later, the table 31 is supported such that it is vertically movable with respect to the base member 15.

The height moving mechanism 32 is a mechanism that allows the vertical movement of the medium M supported by the support surface 31*m* and the support surface 31*m* by moving the table 31 up and down. The height moving mechanism 32 includes a vertical moving motor 33, a vertical movement belt 37, and the lifting mechanism 39. The lifting mechanism 39 includes a ball screw, a nut threadedly engaged with the ball screw, and a pulley disposed along the vertical direction. The ball screw of the lifting mechanism 39 is rotatably supported by the base member 15. The nut of the lifting mechanism 39 is fixed to the protrusion 31*n* of the table 31. The pulley of the lifting mechanism 39 is fixed to an upper part of the ball screw. When the pulley of the lifting mechanism 39 rotates, the ball screw rotates, and the protrusion 31*n* moves along the vertical direction together with the nut along with the rotation of the ball screw.

The vertical moving motor 33 is a motor that rotates under the control of a control unit (not illustrated). The control unit controls the rotational direction and rotation amount of the vertical moving motor 33. The vertical movement belt 37 is an annular belt provided across the output shaft of the vertical moving motor 33 and the pulleys of the four lifting mechanisms 39. When the vertical moving motor 33 rotates, the vertical movement belt 37 is driven into circulation. The vertical movement belt 37 transmits the rotation of the vertical moving motor 33 to the pulleys of the four lifting mechanisms 39. In this manner, the ball screw of the lifting mechanism 39 rotates to move the table 31 along the vertical direction.

The rotational direction of the vertical moving motor 33 can be switched between the positive direction of moving the table 31 upward and the opposite direction of moving the table 31 downward. The recording apparatus 1 moves the table 31 up and down by operating the vertical moving motor 33.

The driving mechanism 50 includes the pair of guide shafts 51 and a frame driving unit 60. The guide shaft 51 is a shaft member provided across the pair of base members 15 and disposed along the front-rear direction.

The frame driving unit 60 includes a frame moving motor 61, a transmission belt 63, a transmission mechanism 65, and a transmission belt 67. The frame moving motor 61 is a motor that rotates under the control of the control unit (not illustrated). The transmission belt 63 is an annular belt provided across the output shaft of the frame moving motor 61 and the transmission mechanism 65, and transmits the driving force of the frame moving motor 61 to the transmission mechanism 65. The transmission mechanism 65 includes a first pulley and a second pulley. The transmission belt 63 is wound around the first pulley, and the transmission belt 67 is wound around the second pulley. The transmission mechanism 65 drives the transmission belt 67 by rotating the second pulley with the driving force transmitted from the transmission belt 63 to the first the pulley. The transmission mechanism 65 transmits the driving force of the frame moving motor 61 to the transmission belt 67 at a reduction ratio corresponding to the diameter ratio between the first pulley and the second pulley.

The transmission belt 67 is an annular belt provided across the transmission mechanism 65 and a frame movement pulley 17 disposed at an end portion on the rear side of the base member 15. The frame movement pulley 17 is a pulley installed in a rotatable manner with respect to the base member 15. The transmission belt 67 is disposed along the guide shaft 51.

The movement unit 70 includes a main frame 71, a pair of leg parts 73, and a carriage 89. The main frame 71 is a plate-shaped member elongated in the left-right direction. The pair of leg parts 73 is fitted to the pair of guide shafts 51, and is movable along the guide shaft 51. The main frame 71 is fixed on the pair of leg parts 73, and is supported by the pair of leg parts 73 from below. The main frame 71 is guided by the pair of guide shafts 51 together with the pair of leg parts 73, and moved in the front-rear direction.

Through a belt coupling part 79, the transmission belt 67 is fixed to the leg part 73 that supports the left end of the main frame 71 of the pair of leg parts 73. In this manner, when the transmission belt 67 is driven into circulation, a power that moves the leg part 73 in the front-rear direction acts on the leg part 73. As a result, the movement unit 70 moves in the front-rear direction. Note that the lower end of the main frame 71 is located above the support surface 31*m* when the table 31 is located uppermost. Thus, the main frame 71 moves in the front-rear direction above the support surface 31*m* without interfering with the support surface 31*m*.

The rotational direction of the frame moving motor 61 can be switched between the positive direction of moving the main frame 71 frontward and the opposite direction of moving the main frame 71 rearward. The recording apparatus 1 moves the main frame 71 forward and rearward by operating the frame moving motor 61.

The carriage 89 is a substantially cuboid box, and is supported by the main frame 71 through a carriage guide shaft 83. The carriage guide shaft 83 is a shaft member fixed to the main frame 71, and extends in the left-right direction along the main frame 71. The carriage guide shaft 83 supports the carriage 89 such that it is movable in the left-right direction. Note that the lower end of the carriage 89 is located above the support surface 31*m* when the table 31 is located uppermost. Thus, the carriage 89 moves in the front-rear direction and left-right direction above the support surface 31*m* without interfering with the support surface 31*m*.

In addition, the carriage 89 is coupled to a carriage drive belt 85. The carriage drive belt 85 is an annular belt disposed along the carriage guide shaft 83 with one end provided around a carriage drive pulley 86 and the other end provided around the output shaft of a carriage driving motor 87. The carriage drive pulley 86 is a pulley rotatably fixed to the right end of the main frame 71. The carriage driving motor 87 is a motor fixed to the left end of the main frame 71, the output shaft of which is rotated under the control of the control unit (not illustrated). By rotating the output shaft, the carriage driving motor 87 drives the carriage drive belt 85 into circulation. In this manner, the carriage driving motor 87 moves the carriage 89 coupled to the carriage drive belt 85 in the left-right direction along the carriage guide shaft 83.

The carriage 89 includes the recording head 89*a* and the irradiation unit 89*b*. The recording head 89*a* includes a plurality of nozzles (not illustrated) that open downward from the lower end surface of the carriage 89. The recording head 89*a* ejects liquid from the nozzles through the driving of a piezo actuator (not illustrated). When the recording head 89*a* ejects the liquid from the nozzles, the ejected liquid flies between the nozzle and the medium M placed on the table 31 and impinges on the medium M. Note that, in this embodiment, the liquid ejected by the recording head 89*a* from the nozzles is ink that is cured by ultraviolet rays. By applying the liquid onto the medium M supported on the medium supporting part 30, the recording head 89*a* records characters and images formed of the liquid on the medium M. The recording head 89*a* corresponds to an example of "recording unit".

The irradiation unit 89*b* includes an irradiation window (not illustrated) that faces downward from the lower end surface of the carriage 89. The irradiation window is composed of a plate composed of an optically transparent material. The irradiation unit 89*b* emits irradiation light from a light source unit (not illustrated) through the irradiation window. The irradiation light emitted from the irradiation unit 89*b* passes between the irradiation window and the medium M placed on the table 31, and irradiates the medium M recorded by the recording head 89*a*. In this embodiment, the irradiation unit 89*b* includes an ultraviolet light emitting diode (UV-LED) that emits ultraviolet rays, and the irradiation light is an ultraviolet ray. That is, in this embodiment, the irradiation unit 89*b* irradiates, with ultraviolet ray, the ink that is cured by the ultraviolet ray impinging on the medium M, and firmly fixes the ink to the medium M.

Figure 4:
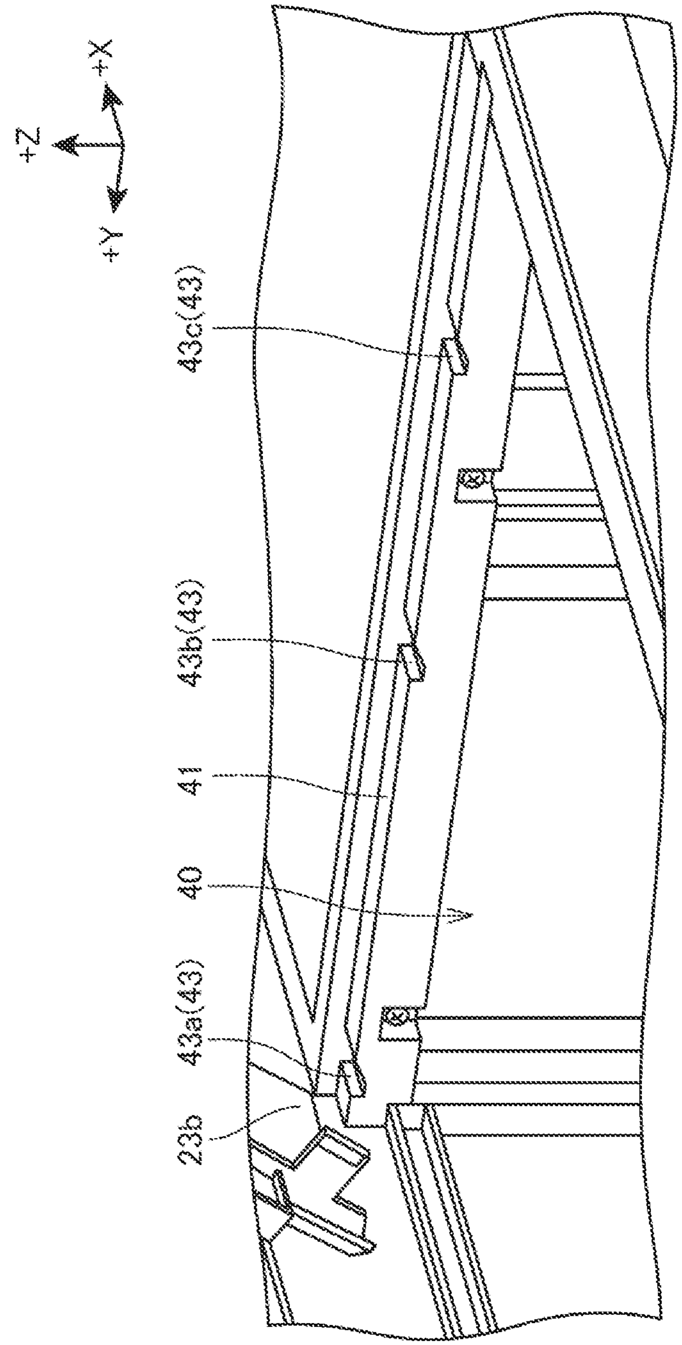
FIG. 4 is a perspective view of a main part of the recording apparatus.

FIG. 4 is a perspective view of a main part of the recording apparatus 1, and illustrates the opening 40. The opening 40 includes a cover supporting part 41 at the top surface 10*b* of the housing 10. The cover supporting part 41 is a rib extending in the front-rear direction along the edge of the opening 40 and protruding toward the inside of the opening 40. A pair of the cover supporting parts 41 is provided at the left and right edges of the opening 40 in a bilaterally symmetric manner. When the housing cover 20 is closed, the cover supporting part 41 supports the first cover 21 from below.

A first fixing part 43*a*, a second fixing part 43*b*, and a third fixing part 43*c* are provided at the cover supporting part 41 of the opening 40. In the following description, the first fixing part 43*a*, the second fixing part 43*b*, and the third fixing part 43*c* are referred to as fixing part 43 when they are not distinguished from one another.

The fixing part 43 is a groove with a shape in which the top surface of the cover supporting part 41 is depressed downward at the edge of the opening 40, and extends in the left-right direction. In the front part of the pair of cover supporting parts 41, a pair of the first fixing parts 43*a* is formed at positions overlapping each other in the left-right direction. In the rear part of the pair of cover supporting parts 41, a pair of the third fixing parts 43*c* is formed at positions overlapping each other in the left-right direction. At a position between the first fixing part 43*a* and the third fixing part 43*c* in the pair of cover supporting parts 41, a pair of the second fixing parts 43*b* is formed at positions overlapping each other in the left-right direction.

The pair of the fixing parts 43 is disposed with a distance in the horizontal direction smaller than the width of a tip end 23*b* of the second cover 23 in the left-right direction. When the tip end 23*b* of the second cover 23 is inserted into the pair of the fixing part 43, the fixing part 43 fixes the tip end 23*b* of the second cover 23 to the opening 40. As described later, when the tip end 23*b* of the second cover 23 is fixed to the opening 40, the housing cover 20 is held at the housing 10 with the first cover 21 and the second cover 23 bent.

2. Configuration of Housing Cover

Figure 5:
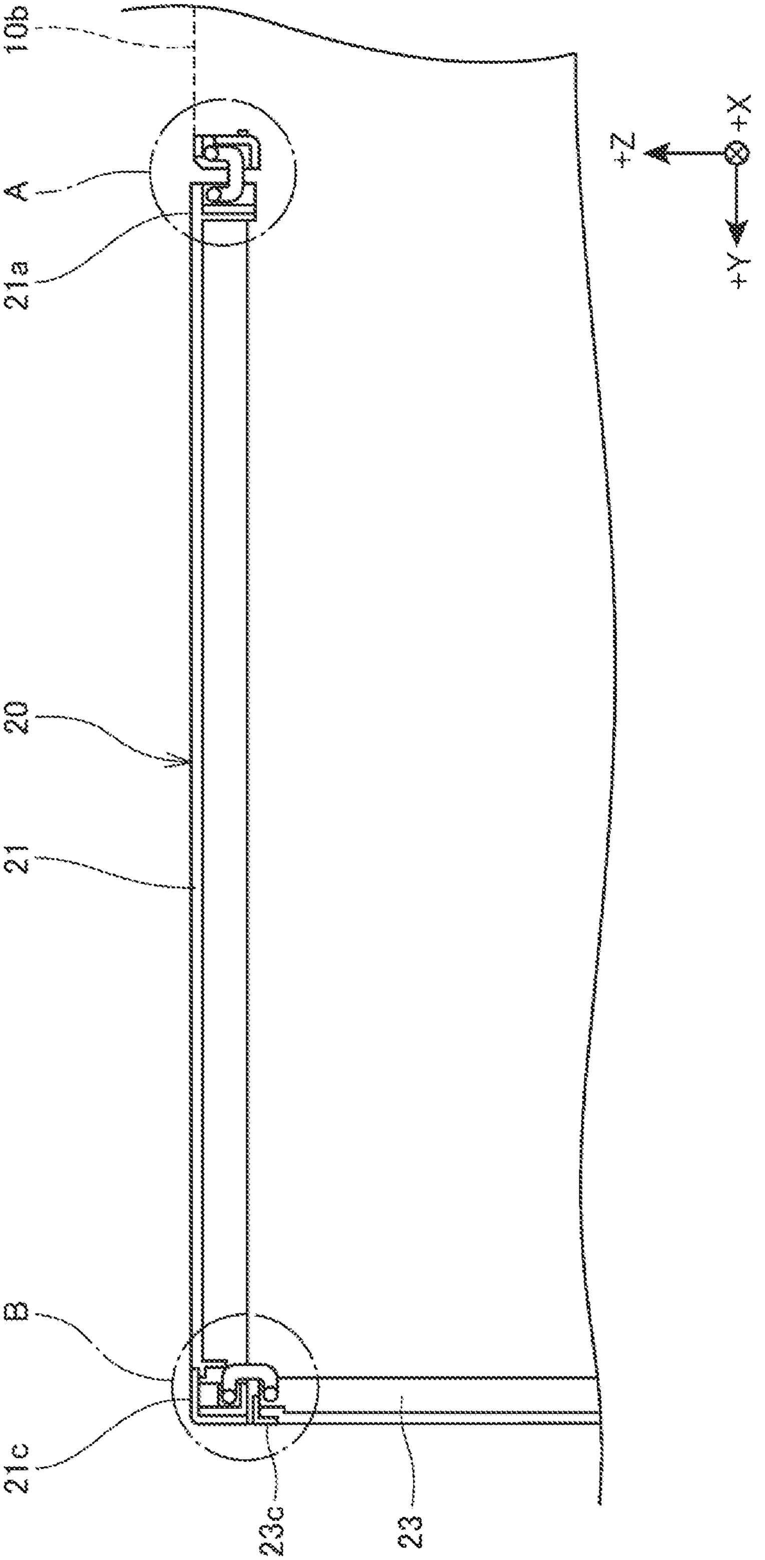
FIG. 5 is a cross-sectional view of a housing cover.
Figure 6:
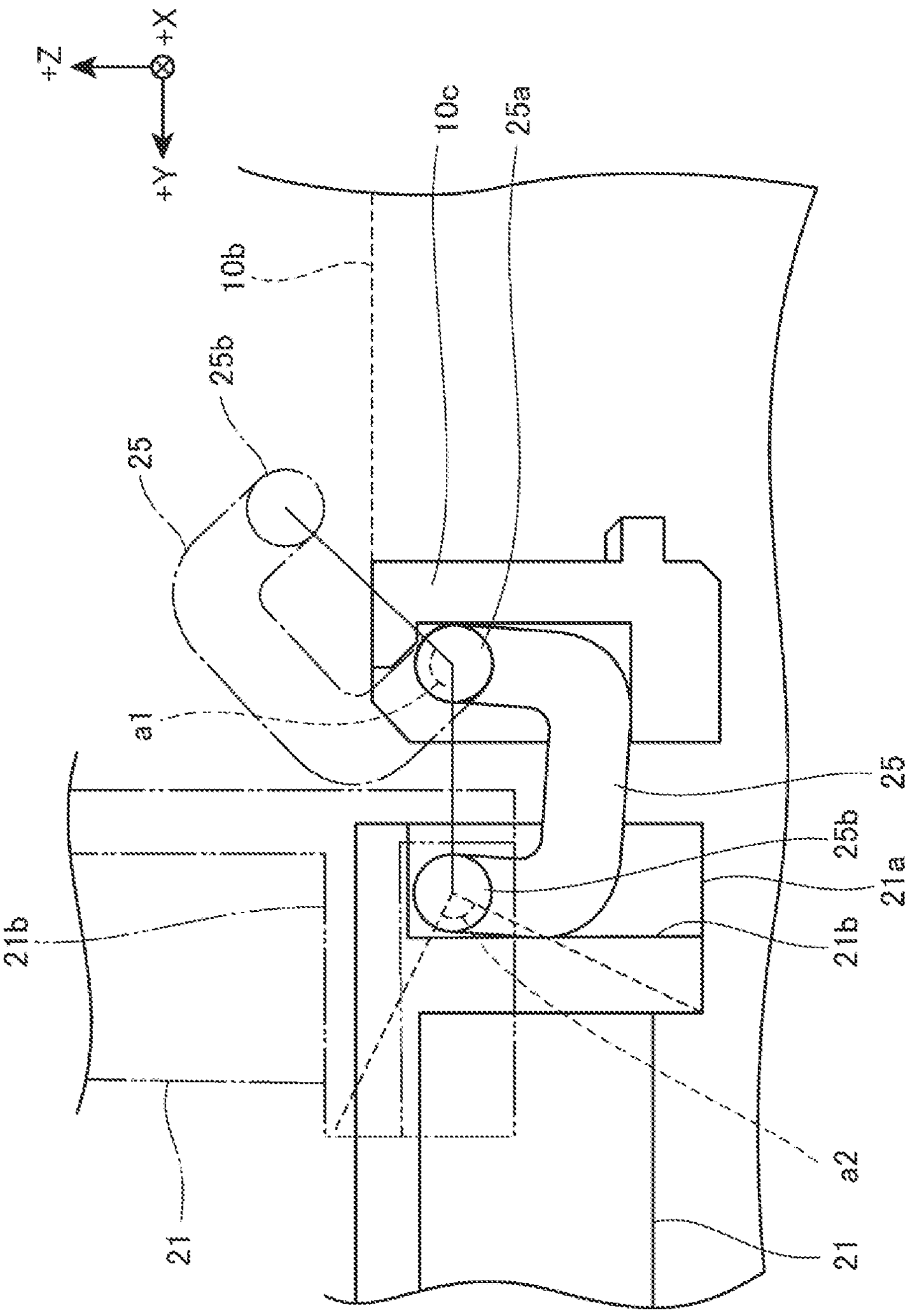
FIG. 6 is an enlarged view of a portion indicated with circle A in FIG. 5.
Figure 7:
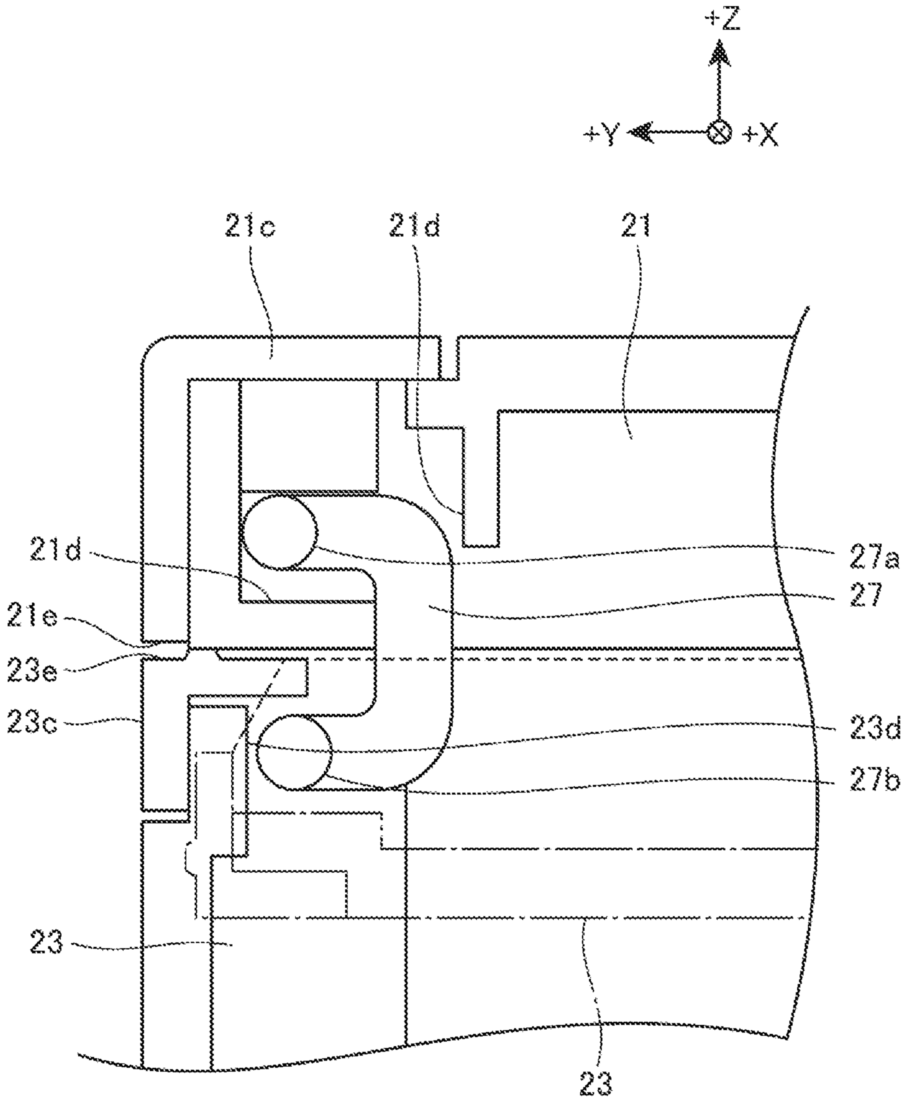
FIG. 7 is an enlarged view of a portion indicated with circle B in FIG. 5.
Figure 8:
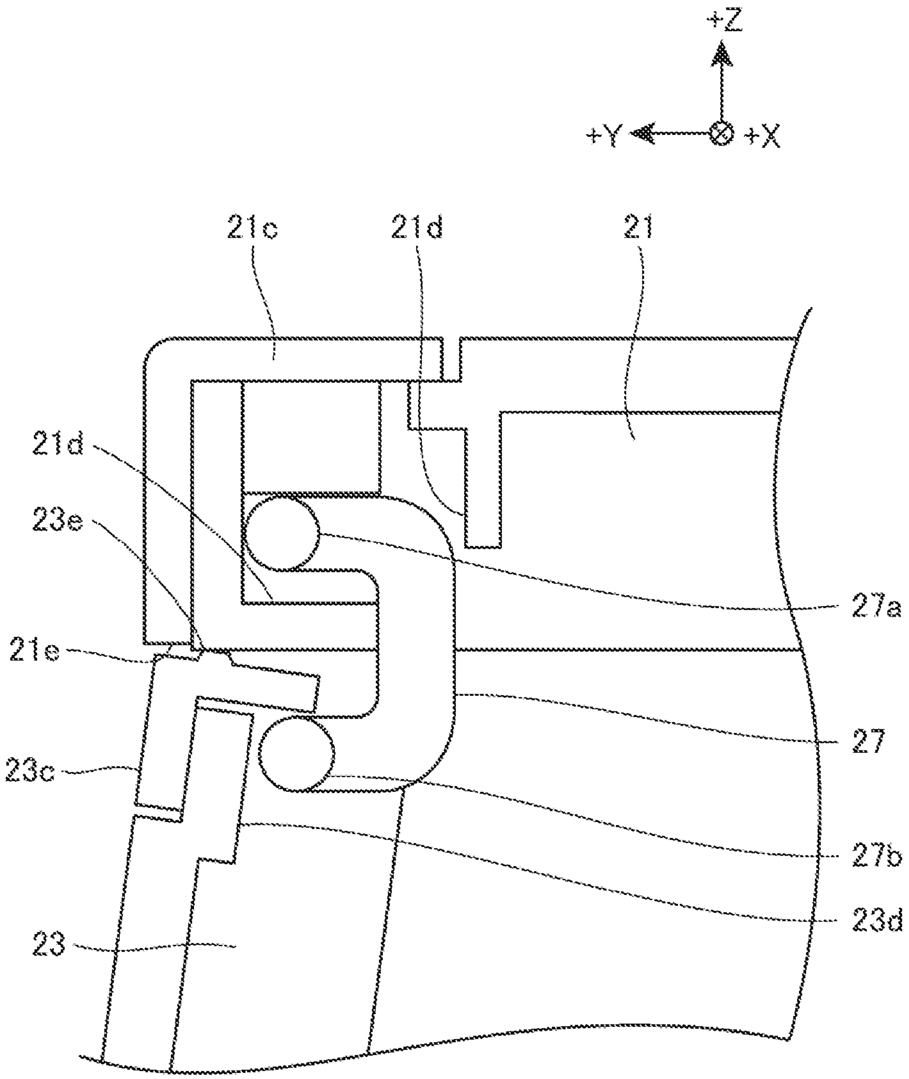
FIG. 8 is an enlarged view of a portion indicated with circle B in FIG. 5.

FIG. 5 is a cross-sectional view of the housing cover 20, and illustrates a cross section perpendicular to the left-right direction in the state where the housing cover 20 is closed. FIG. 6 is an enlarged view of a portion indicated with circle A in FIG. 5. FIGS. 7 and 8 are enlarged views of a portion indicated with circle B in FIG. 5.

The housing cover 20 includes a first hinge 25 and a second hinge 27 in addition to the above-described first cover 21 and second cover 23.

The first cover 21 is coupled to the housing 10 through the first hinge 25. The first hinge 25 is a biaxial hinge that couples the top surface 10*b* of the housing 10 and a rear end portion 21*a* of the first cover 21 in a manner relatively turnable about the left-right direction. The rear end portion 21*a* is a portion located at the rear end of the first cover 21 in the state where the housing cover 20 is closed. As illustrated in FIGS. 5 and 6, the first hinge 25 includes a first shaft 25*a* that couples the first hinge 25 to the housing 10, and a second shaft 25*b* that couples the first hinge 25 to the rear end portion 21*a* of the first cover 21. The first shaft 25*a* couples the first hinge 25 and the top surface 10*b* of the housing 10 in a manner turnable about the left-right direction. The second shaft 25*b* couples the first hinge 25 and the first cover 21 in a manner turnable about the left-right direction. The first hinge 25 corresponds to an example of "first coupling part". The rear end portion 21*a* of the first cover 21 corresponds to an example of "one end portion of first cover".

As illustrated in FIG. 6, a first restriction part 10*c* is provided near the first hinge 25 in the top surface 10*b*. The first restriction part 10*c* is a rib formed at a position overlapping the first hinge 25 in the X axis. When the first hinge 25 relatively turns with respect to the top surface 10*b* about the first shaft 25*a*, the first hinge 25 comes into contact with the first restriction part 10*c* at a position indicated in FIG. 6 with the dashed line, and does not turn any further. That is, by coming into contact with the first hinge 25, the first restriction part 10*c* restricts the angle range in which the first hinge 25 and the top surface 10*b* are relatively turnable. The dashed line in FIG. 6 indicates a position of the first hinge 25 making a largest turn to the rear side, i.e., clockwise in the left side view. As illustrated in FIG. 6, the maximum angle of the rearward turn of the first hinge 25 from the state where the housing cover 20 is closed is an angle a1. In this embodiment, the angle a1 is approximately 135 degrees.

In addition, as illustrated in FIG. 6, a second restriction part 21*b* is provided near the rear end portion 21*a* in the first cover 21. The second restriction part 21*b* is a rib formed at a position overlapping the first hinge 25 in the X axis. When the first cover 21 turns about the second shaft 25*b*, the second restriction part 21*b* comes into contact with the first hinge 25 at a position indicated with the chain double-dashed line in FIG. 6, and the first cover 21 does not turn any further. That is, by coming into contact with the first hinge 25, the second restriction part 21*b* restricts the relatively turnable angle range between the first hinge 25 and the first cover 21. The chain double-dashed line of FIG. 6 indicates a position of the first cover 21 making a largest turn to the rear side, i.e., clockwise in the left side view with respect to the first hinge 25. As illustrated in FIG. 6, the maximum angle of the rearward turn of the first cover 21 with respect to the first hinge 25 from the state where the housing cover 20 is closed is an angle a2. In this embodiment, the angle a2 is approximately 90 degrees.

Thus, the first cover 21 is coupled to the top surface 10*b* of the housing 10 so as to be turnable rearward approximately 225 degrees from the state where the housing cover 20 is closed. The first cover 21 comes into contact with the top surface 10*b* of the housing 10 when the first cover 21 is opened rearward to approximately 180 degrees. Thus, the actual angle at which the first cover 21 can open rearward is approximately 180 degrees.

The second cover 23 is coupled to the first cover 21 through the second hinge 27. The second hinge 27 is a biaxial hinge that couples a front end portion 21*c* of the first cover 21 and an upper end portion 23*c* of the second cover 23 in a manner relatively turnable about the left-right direction. The front end portion 21*c* is a portion located at the front end of the first cover 21 in the state where the housing cover 20 is closed. The upper end portion 23*c* is a portion located at the upper end of the second cover 23 in the state where the housing cover 20 is closed. In this embodiment, the first hinge 25 and the second hinge 27 are biaxial hinges with the same structure. As illustrated in FIGS. 5 and 7, the second hinge 27 includes a third shaft 27*a* coupled to the front end portion 21*c* of the first cover 21, and a fourth shaft 27*b* coupled to the upper end portion 23*c* of the second cover 23. The second hinge 27 is an example of “second coupling part”. The front end portion 21*c* of the first cover 21 is an example of “another end portion of the first cover”. The upper end portion 23*c* of the second cover 23 is an example of “one end of the second cover”.

As illustrated in FIG. 7, a third restriction part 21*d* is formed at the front end portion 21*c* in the first cover 21. The third restriction part 21*d* is a rib formed at a position overlapping the second hinge 27 in the X axis. By coming into contact with the second hinge 27, the third restriction part 21*d* fixes the second hinge 27 and the first cover 21 such that they cannot relatively turn.

In addition, as illustrated in FIG. 7, a fourth restriction part 23*d* is formed at the upper end portion 23*c* of the second cover 23. The fourth restriction part 23*d* is a rib formed at a position overlapping the second hinge 27 in the X axis. By coming into contact with the second hinge 27, the fourth restriction part 23*d* restricts the angle range in which the second cover 23 can relatively turn with respect to the second hinge 27. FIG. 7 indicates, with the dashed line, a position of the second cover 23 making a largest turn to the rear side, i.e., counterclockwise in the left side view with respect to the second hinge 27. As illustrated in FIG. 7, the second cover 23 is turnable to a position where the second cover 23 is approximately parallel to and overlaps the first cover 21.

FIG. 8 is an enlarged view of a portion indicated with circle B in FIG. 5, and illustrates a state where the grip 23*a* is pulled forward. As illustrated in FIG. 8, the second cover 23 is turnable to the front side, i.e., clockwise in the left side view from the state where the housing cover 20 is closed. In this case, when a second contact part 23*e* comes into contact with a first contact part 21*e*, the turning of the second cover 23 is restricted. The first contact part 21*e* is a rib formed in the first cover 21. The second contact part 23*e* is a rib formed in the second cover 23, and is located at a position overlapping the first contact part 21*e* in the X axis. In addition, the first contact part 21*e* and the second contact part 23*e* are formed to come into contact with each other in the up-down direction. The second cover 23 turns approximately 5 degrees in the front direction until the turning is restricted by the contact between the first contact part 21*e* and the second contact part 23*e*.

Figure 9:
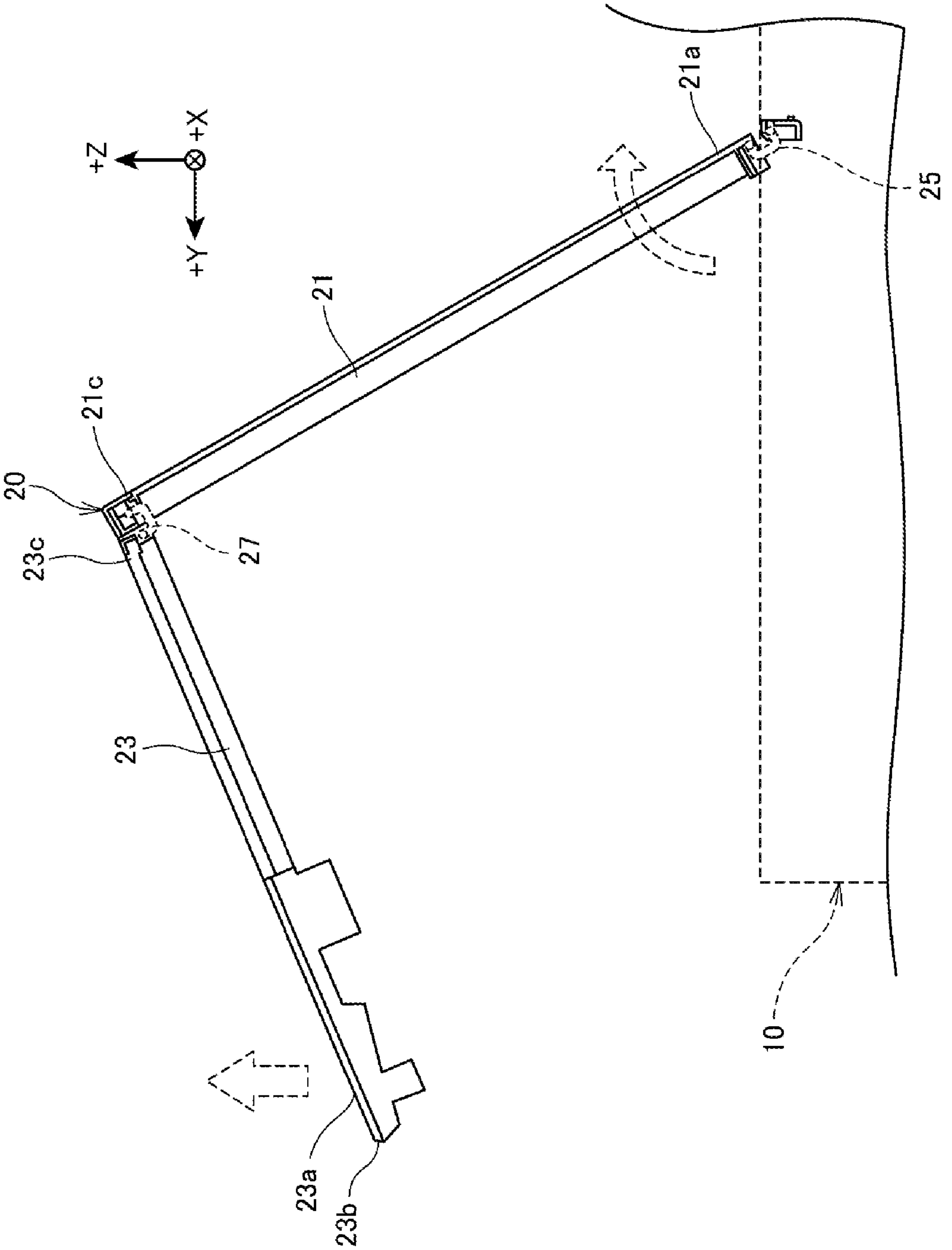
FIG. 9 is a cross-sectional view of a first hinge.
Figure 10:
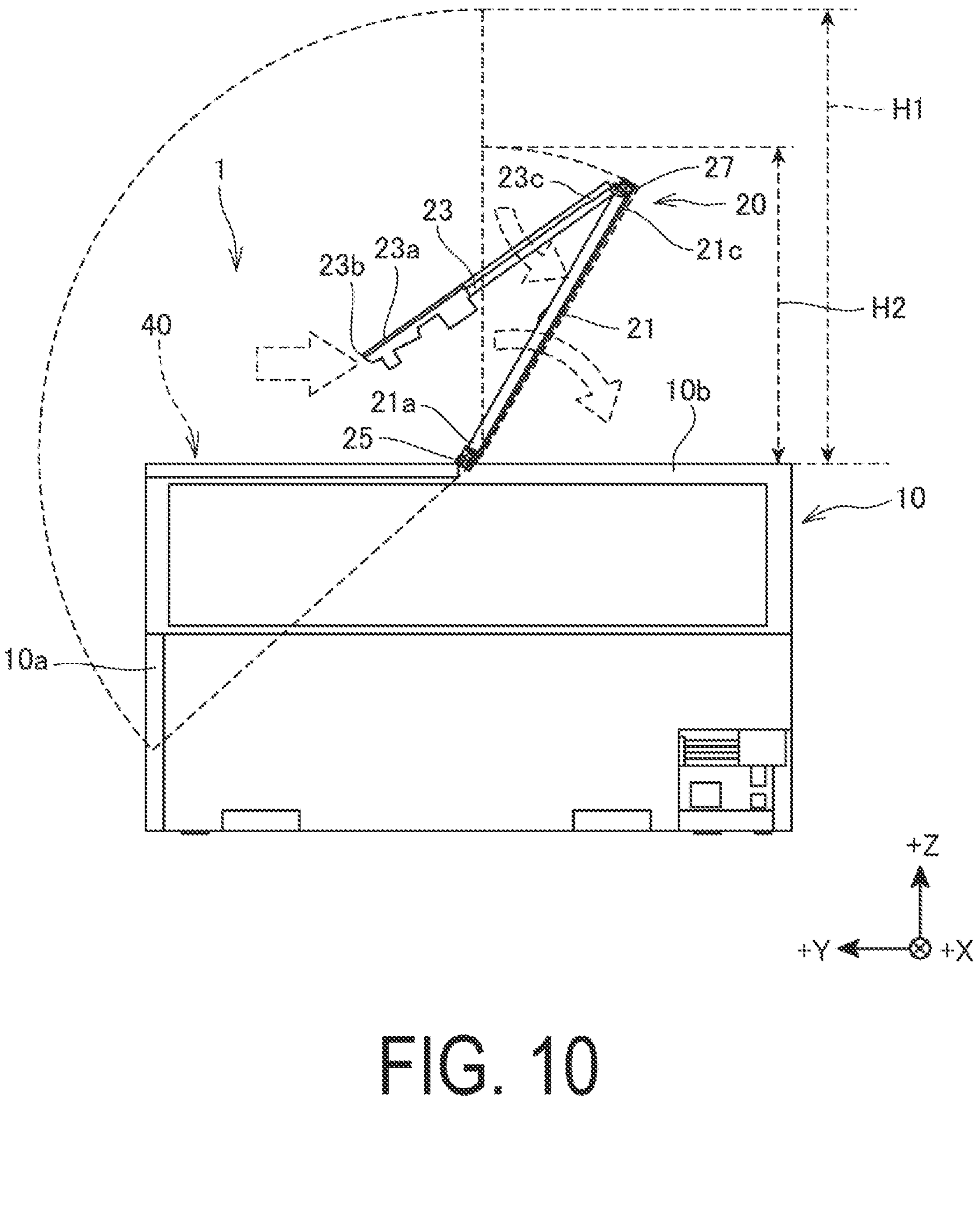
FIG. 10 is a side view of the recording apparatus.
Figure 11:
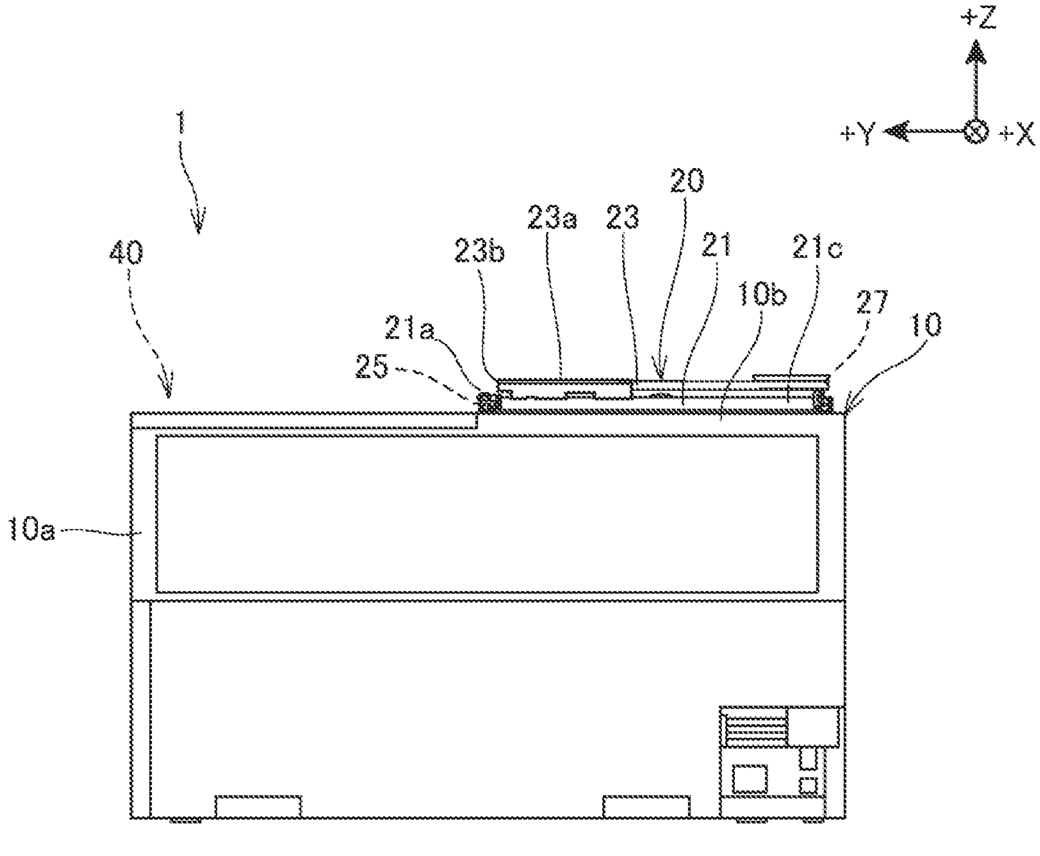
FIG. 11 is a side view of the recording apparatus.
Figure 12:
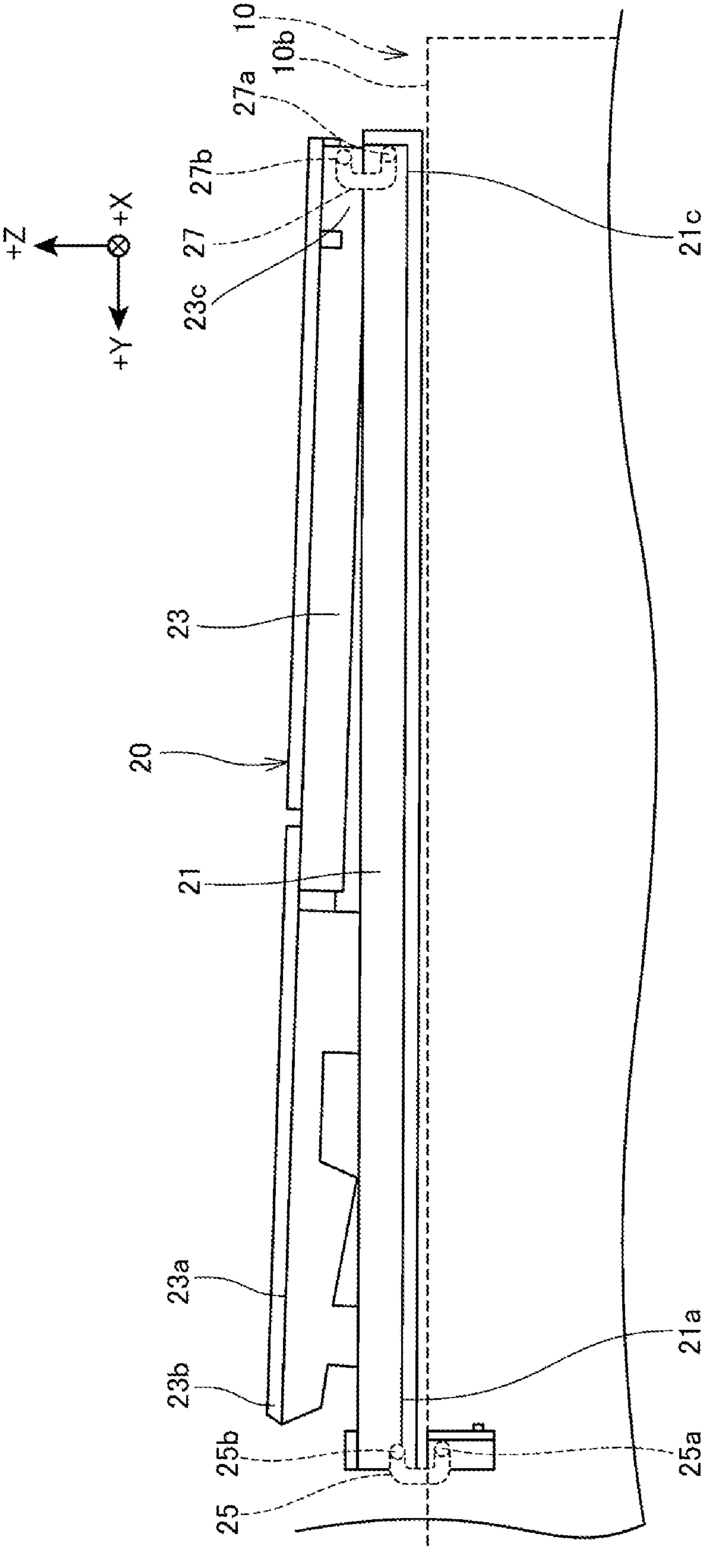
FIG. 12 is a side view of the housing cover.

3. Operation of Recording Apparatus 3.1. Operation of Completely Opening Housing Cover An operation of completely opening the housing cover 20 by the user in the recording apparatus 1 having the above-mentioned configuration is described below with reference to FIGS. 5 and 8 to 12. FIG. 9 is a cross-sectional view of the first hinge 25, FIGS. 10 and 11 are side views of the recording apparatus 1, and FIG. 12 is a side view of the housing cover 20. Here “completely opening” is an operation of opening up to a maximum turned state within the movable range in which the first hinge 25 is turnable. While an operation of opening until the housing cover 20 comes into contact with the housing is the completely opening operation in the present example, the present disclosure is not limited thereto. When there is a contact member in the middle, the operation of opening until the housing cover 20 comes into contact with that member is the completely opening operation.

The user opens the housing cover 20 before placing the medium M on the support surface 31*m* or before removing the medium M from the support surface 31*m*, for example.

In the state where the housing cover 20 is closed, the first cover 21 is approximately perpendicular to the up-down direction, and the second cover 23 is approximately perpendicular to the front-rear direction as illustrated in FIG. 5. Therefore, in the state where the housing cover 20 is closed, the first cover 21 and the second cover 23 substantially perpendicularly intersect each other.

When opening the housing cover 20, first, the grip 23*a* is pulled to the front direction with the user’s hand. In this manner, as illustrated in FIG. 8, the second cover 23 turns forward about the fourth shaft 27*b*, and the first contact part 21*e* and the second contact part 23*e* come into contact with each other in the up-down direction.

When the user further pulls the grip 23*a* forward in this state, the second contact part 23*e* is pressed upward against the first contact part 21*e*. That is, the force of the user pulling the grip 23*a* forward is converted to the force of pushing the first contact part 21*e* upward. In this manner, the housing cover 20 begins to turn about the first shaft 25*a* such that the front end portion 21*c* of the first cover 21 moves upward. At this time, the grip 23*a* begins to move upward.

After the grip 23*a* begins to move upward, the user pulls the grip 23*a* upward. As a result, the housing cover 20 turns clockwise in the left side view about the first shaft 25*a* as illustrated in FIG. 9.

Thereafter, the user pushes the grip 23*a* rearward. As a result, the second cover 23 turns counterclockwise in the left side view about the fourth shaft 27*b* as illustrated in FIG. 10. Specifically, the housing cover 20 is folded in such a manner that the first cover 21 and the second cover 23 overlap each other. Simultaneously, the first cover 21 turns clockwise in the left side view about the first shaft 25*a* and the second shaft 25*b*. In this manner, the housing cover 20 opens by turning clockwise in the left side view about the first shaft 25*a* and the second shaft 25*b*. That is, the housing cover 20 opens with the first cover 21 and the second cover 23 turning in opposite directions.

As described above, the housing cover 20 is opened while being folded. Therefore, the highest position where the housing cover 20 reaches while the housing cover 20 is opened is a position apart from the top surface 10*b* of the housing 10 by a distance H2 on the upper side illustrated in FIG. 10. Note that the distance H2 is substantially the same as the length along the direction from the rear end portion 21*a* toward the front end portion 21*c* in the first cover 21.

On the other hand, unlike in this embodiment, when the housing cover 20 is opened without being folded from the state where the housing cover 20 is closed, the highest position where the housing cover 20 reaches is a position apart from the top surface 10*b* of the housing 10 by a distance H1 on the upper side illustrated in FIG. 10. Note that the distance H1 is substantially the same as the distance from the first hinge 25 to the tip end 23*b* of the housing cover 20.

In this embodiment, the distance H2 is smaller than the distance H1. Thus, since the housing cover 20 is opened while being folded, less space is required when the housing cover 20 is opened.

Thereafter, the first cover 21 comes into contact with the top surface 10*b* of the housing 10, and the user releases his/her hand from the grip 23*a*. In this manner, the housing cover 20 is completely opened as illustrated in FIGS. 11 and 12. The housing cover 20 in the completely opened state is held by the housing 10 with the first cover 21 in contact with the top surface 10*b* and the rear surface of the first cover 21 and the rear surface of the second cover 23 overlapping each other. The rear surface of the first cover 21 is a surface that faces the inner surface of the housing 10 in the state where the housing cover 20 is closed. The rear surface of the second cover 23 is a surface that faces the inner surface of the housing 10 in the state where the housing cover 20 is closed.

3.2. Operation of Holding Housing Cover in the Middle of Opening

Figure 13:
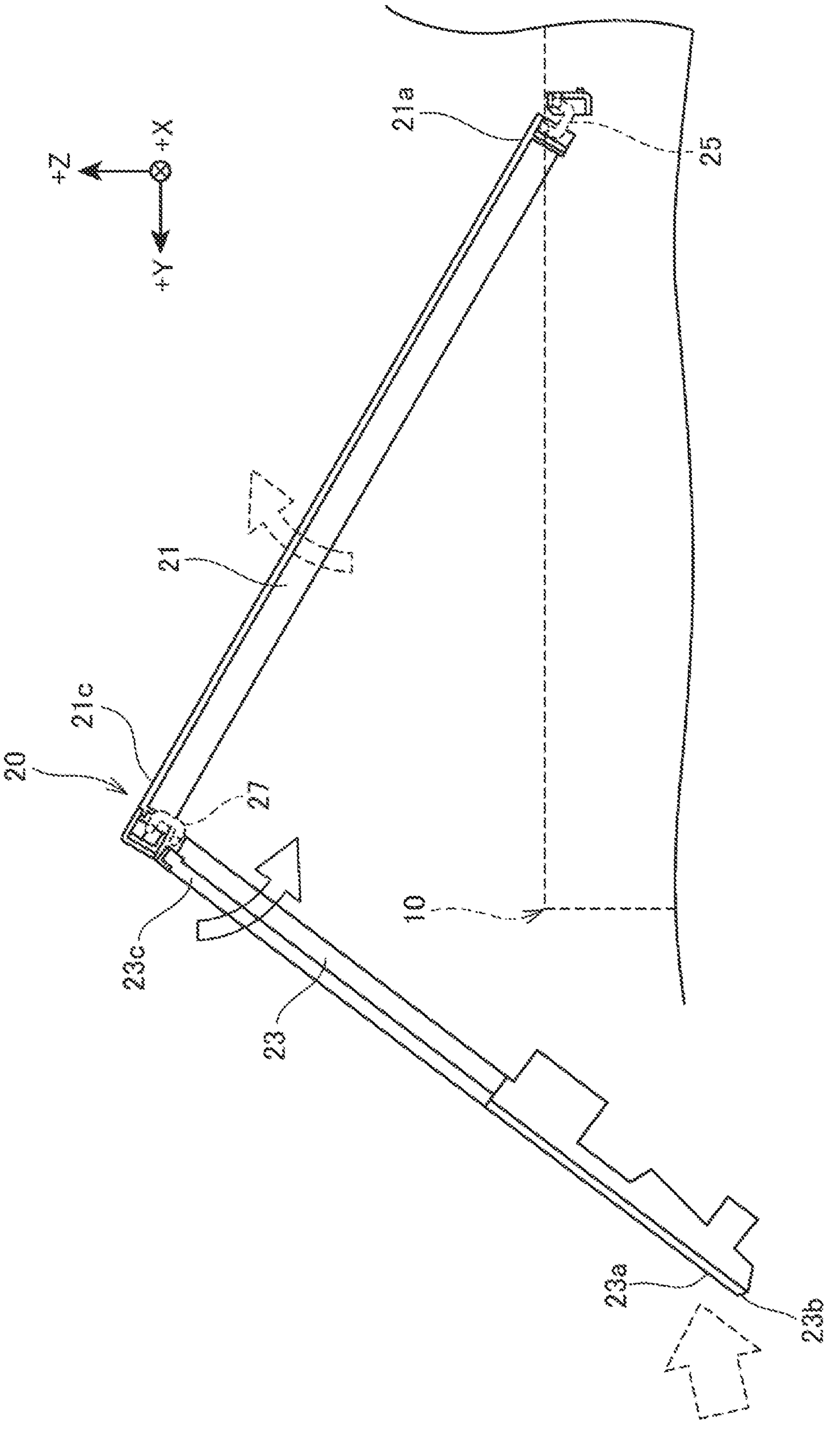
FIG. 13 is a side view of the housing cover.
Figure 14:
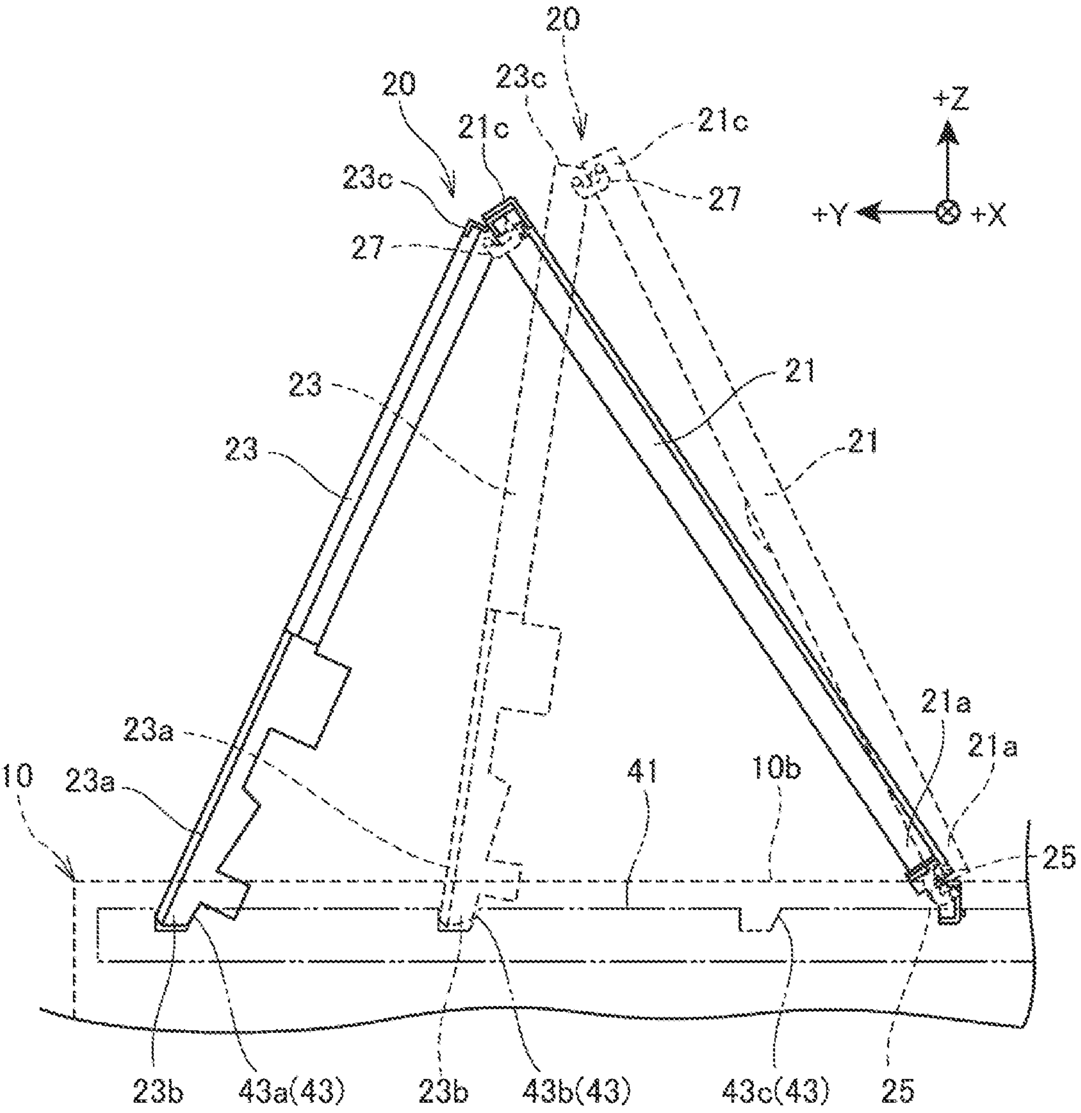
FIG. 14 is a side view of the housing cover.

Next, an operation in which the housing cover 20 is held at a mid-opening position is described with reference to FIGS. 5, 13, and 14. FIGS. 13 and 14 are side views of the housing cover 20.

In the recording apparatus 1, it is not necessary to completely open the housing cover 20 when the medium M sufficiently smaller than the opening 40 is placed on the support surface 31*m* from the outside of the housing 10 and the like, for example. In such a case, when a part of the opening 40 is not covered by the housing cover 20, the medium M can be supported by the medium supporting part 30. To handle such a case, the recording apparatus 1 can hold the housing cover 20 in the middle of the operation of completely opening the housing cover 20. An operation of holding the housing cover 20 in the middle of the operation of completely opening the housing cover 20 from the state where the housing cover 20 is closed is described below.

As illustrated in FIG. 5, the grip 23*a* is pulled to the front side with the user's hand from the state where the housing cover 20 is closed. In this manner, the housing cover 20 turns about the first shaft 25*a* such that the front end portion 21*c* of the first cover 21 moves upward as described above, and the grip 23*a* begins to move upward.

Thereafter, the user pulls the grip 23*a* upward. Next, the user begins to push the grip 23*a* rearward at an earlier timing than pushing the grip 23*a* rearward when performing the operation of completely opening the housing cover 20 as illustrated in FIG. 13. In this manner, the second cover 23 turns counterclockwise in the left side view about the fourth shaft 27*b*. Specifically, the housing cover 20 is folded in such a manner that the first cover 21 and the second cover 23 overlap each other. Simultaneously, the first cover 21 turns clockwise in the left side view about the first shaft 25*a* and the second shaft 25*b*. At this time, the front end portion 21*c* moves upward. In this manner, the tip end 23*b* of the second cover 23 moves to the upper side of the cover supporting part 41 of the opening 40.

The user moves the grip 23*a* in this state, and fits the tip end 23*b* of the second cover 23 to the first fixing part 43*a* as illustrated in FIG. 14. In this manner, the tip end 23*b* is fixed to the opening 40 through the first fixing part 43*a*. In addition, when the tip end 23*b* is fixed to the opening 40, the housing cover 20 is held by the housing 10 with the first cover 21 and the second cover 23 bent.

FIG. 14 illustrates, with the broken line, a state where the tip end 23*b* is fitted to the second fixing part 43*b*. As illustrated in FIG. 14, the tip end 23*b* can be fixed even when the tip end 23*b* is fitted to the second fixing part 43*b* and the third fixing part 43*c*. Thus, the tip end 23*b* of the second cover 23 can be fixed at the fixing parts 43 provided at a plurality of locations in the cover supporting part 41 of the opening 40. In this manner, the housing cover 20 is held by the housing 10 with the first cover 21 and the second cover 23 bent.

4. Effects

As described above, the recording apparatus 1 according to the embodiment includes the medium supporting part 30 that supports the medium M, the recording head 89*a* that performs recording on the medium M supported by the medium supporting part 30, and the housing 10 that covers the medium supporting part 30 and the recording head 89*a*. The opening 40 for communication between the inside and outside of the housing 10 is provided in the top surface 10*b* and the front surface 10*a* that intersects the top surface 10*b* of the housing 10, and the housing 10 includes the housing cover 20 that is openable and closable and that covers the opening 40. The housing cover 20 includes the first cover 21 that covers the opening 40 at the top surface 10*b*, and the second cover 23 that covers the opening 40 at the front surface 10*a*. The first cover 21 is coupled to the housing 10 by the first hinge 25, and the second cover 23 is coupled to the first cover 21 through the second hinge 27. The first hinge 25 couples the housing 10 and the rear end portion 21*a* of the first cover 21 in a manner relatively turnable about the left-right direction. The second hinge 27 couples the front end portion 21*c* of the first cover 21 and the upper end portion 23*c* of the second cover 23 in a manner relatively turnable about the left-right direction. The housing cover 20 is held by the housing 10, in the state where the housing cover 20 is completely opened, with the rear surface of the first cover 21 and the rear surface of the second cover 23 overlapping each other.

With this configuration, the opening 40 can be widely opened across the top surface 10*b* and the front surface 10*a* that intersects the top surface 10*b* by opening the housing cover 20. Thus, the medium supporting part 30 is accessible from the wide opening 40. In addition, the space required for opening the housing cover 20 can be reduced. Thus, the installation space of the recording apparatus 1 can be reduced.

The tip end 23*b* of the second cover 23 can be fixed to the opening 40. When the tip end 23*b* of the second cover 23 is fixed to the opening 40, the housing cover 20 is held by the housing 10 with the first cover 21 and the second cover 23 bent.

With this configuration, the recording apparatus 1 can hold the housing cover 20 in the state where a part of the opening 40 is opened. Thus, an operation of causing the medium supporting part 30 to support the medium M sufficiently smaller than the opening 40 from the outside of the housing 10 can be quickly performed, for example.

The first fixing part 43*a* is provided at the edge of the opening 40. The first fixing part 43*a* is a groove formed at the edge of the opening 40. When the tip end 23*b* of the second cover 23 is inserted into the first fixing part 43*a*, the first fixing part 43*a* fixes the second cover 23 to the opening 40.

With this configuration, the second cover 23 can be quickly fixed by inserting the tip end of the second cover 23 into the first fixing part 43*a*. Thus, the operation of causing the medium supporting part 30 to support the medium M sufficiently smaller than the opening 40 from the outside of the housing 10 can be further quickly performed, for example.

The second fixing part 43*b* is provided at the edge of the opening 40. The second fixing part 43*b* is a groove formed at the edge of the opening 40. When the tip end 23*b* of the second cover 23 is inserted into the second fixing part 43*b*, the second fixing part 43*b* fixes the second cover 23 to the opening 40.

With this configuration, the tip end 23*b* of the second cover 23 can be fixed to a plurality of locations in the opening 40. Thus, the recording apparatus 1 can change the size of the opening region of the opening 40 in a plurality of levels, and the convenience of the recording apparatus 1 is improved.

The first hinge 25 is a biaxial hinge including the first shaft 25*a* coupled to the housing 10 and the second shaft 25*b* coupled to the rear end portion 21*a* of the first cover 21. The housing cover 20 in the completely opened state is held by the housing 10 with the first cover 21 in contact with the top surface 10*b*.

With this configuration, with the first hinge 25 as a biaxial hinge, the first cover 21 can be turned until the first cover 21 comes into contact with the top surface 10*b*. Thus, the housing cover 20 in the completely opened state can be made compact and stably held.

The second hinge 27 includes the third shaft 27*a* coupled to the front end portion 21*c* of the first cover 21 and the fourth shaft 27*b* coupled to the upper end portion 23*c* of the second cover 23. In addition, the first hinge 25 and the second hinge 27 are biaxial hinges with the same structure.

With this configuration, biaxial hinges with the same structure can be used as the first hinge 25 and the second hinge 27. Thus, biaxial hinges of a single type can be used as common spares for the first hinge 25 and the second hinge 27, and the maintainability of the recording apparatus 1 is improved. In addition, the manufacturing cost of the recording apparatus 1 can be suppressed.

5. Other Embodiments

The above embodiment is only one specific example of the application of the present disclosure. The disclosure is not limited to the configuration of the above embodiment, but can be implemented in various forms to the extent that it does not depart from the gist of the disclosure.

Figure 15:
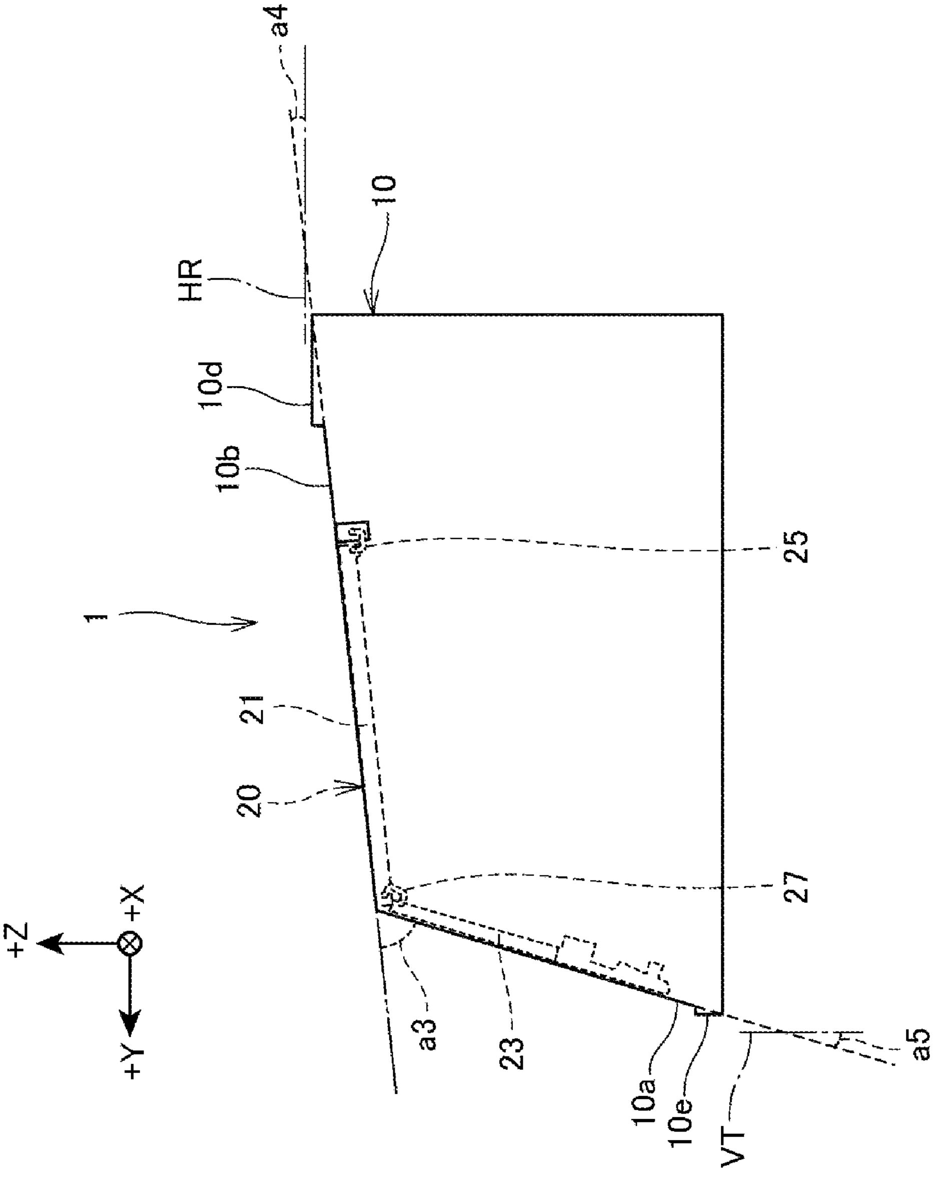
FIG. 15 is a side view of a recording apparatus according to another embodiment.

In the above-described embodiment, it has been described that the first cover 21 extends along the top surface 10*b* and the second cover 23 extends along the front surface 10*a*. In addition, it has been described that the top surface 10*b* is described as an approximately horizontal surface and the front surface 10*a* as a surface approximately parallel to the vertical direction. Further, it has been described that the top surface 10*b* and the front surface 10*a* are described as substantially perpendicularly intersecting each other. However, the above-mentioned configurations are examples. For example, as illustrated in FIG. 15, the top surface 10*b* may be tilted upward or downward from the rear portion to the front portion. In addition, the front surface 10*a* may be tilted forward or rearward from the lower portion to the upper portion. More specifically, when a difference a3 in angle between the front surface 10*a* and the top surface 10*b* is 20 degrees or greater, the opening 40 can be sufficiently widely opened. That is, at the top surface 10*b*, an inclination angle a4 of approximately plus or minus 30 degrees from a horizontal surface HR is allowable. In addition, at the front surface 10*a*, an inclination angle a5 of approximately plus or minus 40 degrees from a vertical line VT along the vertical direction is allowable. Further, as illustrated in FIG. 15, the housing 10 may include a second top surface 10*d* located above the top surface 10*b*, and a second front surface 10*e* located forward of the front surface 10*a*. In addition, the front surface 10*a* and the top surface 10*b* may be flat surfaces or curved surfaces.

While the configuration in which after liquid is ejected to the medium M by the recording head 89*a*, the irradiation unit 89*b* irradiates the impinged liquid with irradiation light is described in this embodiment, this is an example. For example, the recording apparatus 1 may include no irradiation unit 89*b*.

What is claimed is:

1. A recording apparatus comprising:
- a medium supporting part configured to support a medium;
- a recording unit configured to perform recording on the medium supported by the medium supporting part; and
- a housing covering the medium supporting part and the recording unit, wherein
- an opening for communication between inside and outside of the housing is provided in a first surface and a second surface intersecting the first surface of the housing,
- the housing includes a housing cover being openable and closable and configured to cover the opening,
- the housing cover includes a first cover configured to cover the opening in the first surface and a second cover configured to cover the opening in the second surface,
- the first cover is coupled to the housing by a first coupling part,
- the second cover is coupled to the first cover through a second coupling part, the first coupling part couples the housing and one end portion of the first cover in a manner relatively turnable about a first direction, the second coupling part couples another end portion of the first cover and one end of the second cover in a manner relatively turnable about the first direction, and the housing cover is held by the housing, in a state where the housing cover is completely opened, with a rear surface of the first cover and a rear surface of the second cover overlapping each other.

2. The recording apparatus according to claim 1, wherein a tip end of the second cover is fixable to the opening and when the tip end of the second cover is fixed to the opening, the housing cover is held by the housing with the first cover and the second cover bent.

3. The recording apparatus according to claim 2, wherein a first fixing part is provided at an edge of the opening and the first fixing part is a first groove formed at the edge of the opening, and fixes the second cover to the opening when the tip end of the second cover is inserted into the first groove.

4. The recording apparatus according to claim 3, wherein a second fixing part is provided at the edge of the opening and the second fixing part is a second groove formed at the edge of the opening, and fixes the second cover to the opening when the tip end of the second cover is inserted into the second groove.

5. The recording apparatus according to claim 1, wherein the first coupling part is a biaxial hinge including a first shaft coupled to the housing and a second shaft coupled to the one end portion of the first cover and the housing cover in a completely opened state is held by the housing with the first cover in contact with the first surface.

6. The recording apparatus according to claim 5, wherein the second coupling part includes a third shaft coupled to the another end portion of the first cover and a fourth shaft coupled to the one end of the second cover and the first coupling part and the second coupling part are biaxial hinges with the same structure.

* * * * *